United States Patent [19]
Hsien

[11] Patent Number: 6,064,702
[45] Date of Patent: May 16, 2000

[54] FOUR-STAGE PHASE DEMODULATION LOW FREQUENCY WIRELESS MOUSE DEVICE

[75] Inventor: Po-Hsun Hsien, Kaohsiung, Taiwan

[73] Assignee: Kye Systems Corp., Taipei Hsien, Taiwan

[21] Appl. No.: 08/892,988

[22] Filed: Jul. 15, 1997

[30] Foreign Application Priority Data

Jul. 19, 1996 [TW] Taiwan .................................. 8511066

[51] Int. Cl.[7] .............................. H03D 3/22; H04L 27/22
[52] U.S. Cl. .......................... 375/332; 375/349; 345/163; 329/304; 329/345
[58] Field of Search ..................................... 375/329, 332, 375/349, 259, 279, 280, 281, 219, 257, 331; 340/825.69, 825.72, 825.54; 345/158, 163, 169; 329/304, 345, 346

[56] References Cited

U.S. PATENT DOCUMENTS 3,800,228  3/1974  Acker .
5,235,424  8/1993  Wagner et al. .

Primary Examiner—Chi H. Pham
Assistant Examiner—Jean B Corrielus
Attorney, Agent, or Firm—Bacon & Thomas

[57] ABSTRACT

A four-stage phase demodulation low frequency wireless mouse device is disclosed, improving a shortcoming of a conventional low frequency wireless mouse device which can not effectively overcome the signal interference and prevent the misoperations by only using I and Q axes or a quadrature demodulation method and the present invention installs a phase demodulation circuit on a receiving end for generating four sets of phase signals each having a phase of 0°, 90°, 180° and 270° respectively. Then, each of the quadrature signals is sent into a microprocessor for processing to become a computer interfacing signal after passing through a low pass filter, a detecting circuit and a voltage comparator respectively so that the signal interference is effectively eliminated, the misoperation is obviated and the reaction speed of the signal is enhanced due to a low error rate.

8 Claims, 7 Drawing Sheets

FOUR-STAGE PHASE DEMODULATION LOW FREQUENCY WIRELESS MOUSE DEVICE

BACKGROUND OF THE INVENTION

1. The Field of the Invention

The present invention relates to a four-stage phase demodulation low frequency wireless mouse device which divides signals received at a receiving end into four sets of signals having phase information to achieve a preferable noise immunity and increase the reaction speed after being filtered and detected by a low pass filter and a detecting circuit respectively.

2. Description of the Related Art

The present input devices for a computer are divided into a keyboard, a mouse, a trackball, a digital pad, a touch pad and other devices. Due to the increasing use of WINDOW systems in computers, an input device, such as a mouse or a trackball or the like, has become a necessarily fundamental piece of equipment. As to the implementation of a mouse, as a conventional wireline mouse is encumbered with a cable which causes a problem that the mouse can not be dexterously operated, a so-called wireless mouse has become very popular. The way of propagating the signals of the wireless mouse is categorized into two types, one is infrared and the other is ultraviolet. The corresponding relation between the wireless mouse and a receiving device should be a straight line so that an infrared ray can be normally operated since the infrared ray is a linear wave and thus, the infrared wireless mouse is very practical in its physical application and the wireless mouse using a radio transmission method forms a design with less constraints. However, the radio transmission method has its inherent limitation, that is, the radio transmission method is easily interfered with by electromagnetic waves outside which causes a misoperation problem. The electromagnetic interference phenomenon on a computer screen is one example of interference in the radio transmission method since the carrier frequency of a low frequency wireless mouse device is about 100 KHz and the second harmonic (64 KHz to 128 KHz) of a horizontal frequency (32 KHz to 64 KHz) of the computer screen is coincided with the aforesaid carrier frequency. To solve the wireless mouse can only be achieved by raising the mouse immune ability of a wireless receiving device itself.

Taiwan Patent Application No. 79107306, now Taiwan Patent No. 149253 entitled "Wireless Computer Mouse", discloses a quadrature demodulation structure installed on a signal receiving end. As shown in FIG. 3, a radio signal is sent out from a wireless mouse through an AND gate 91, an amplifier 92 and an LC resonant network 93 and the signal is received by an LC parallel resonant network 94 of the signal receiving end. After two mutually inverted signals are generated as the received signal passing through a positive-phase amplifier and a negative-phase amplifier, two sets of signals having a respective phase of 0° and 90° are generated by two electronic switches 971, 972 in which the opening and closing of the two electronic switches 971, 972 are respectively controlled by two sets of timing signals each having a respectively phase of 0° and 90°. Then, the two signals with a phase difference of 90° are combined to form data of mouse (DATA) at an adder 99 after passing through two low pass filters 973, 974 and two amplifiers 981, 982.

Even though the above-described phase demodulation method can decrease tile noise signals, the filtering effect by merely dividing signals into two sets of quadrature amplitude signals still needs to be improved. Furthermore, the reaction speed of the signals can not be increased due to the limitation of noise eliminating ability. Therefore, some problems still remain unsolved.

SUMMARY OF THE INVENTION

The present invention is directed to a four-stage phase demodulation low frequency wireless mouse device that substantially obviates one or more of the problems due to limitations and disadvantages of the related art.

Accordingly, an objective of the present invention is to provide a four-stage phase demodulation low frequency wireless mouse device in which a received signal is phase-demodulated to four sets of quadrature phase signals having a respective phase of 0°, 90°, 180° and 270° and then the phase-demodulated signal is recovered to a mouse signal after being low pass filtered, detected and voltage compared respectively such that a remarkable effect of noise elimination is achieved. Furthermore, with the characteristic of low error rate, the reaction speed of the signal is also enhanced, In accordance with one aspect of the invention, there is provided a four-stage phase demodulation low frequency wireless mouse device formed of a wireless transmitting section and a signal receiving section in which the signal receiving section includes: a tunable LC parallel resonant receiving network for receiving radio-frequency carrier signals from the wireless transmitting section; two sets of amplifiers for sending a positive-phase signal and a negative-phase signal; a baseband generator for generating a time-based signal required for phase demodulation; a tunable frequency dividing circuit for sending out two sets of timing signals mutually having different frequencies; a phase demodulation circuit for generating four sets of phase output signals mutually having a phase difference of 90° with each other; four sets of low pass filters for respectively filtering the four sets of phase output signals from the phase demodulation circuit; a detecting circuit for detecting and combining the phase output signals into a single signal after being filtered; and a voltage comparator for converting and recovering the single signal into an original pulse signal.

BRIEF DESCRIPTION OF THE DRAWINGS

The above objective, other features and advantages of the present invention will become more apparent by describing in detail the preferred embodiments thereof with reference to the attached drawings, in which.

DETAILED DESCRIPTION OF THE PREFERRED EMBODIMENT

Figure 1:
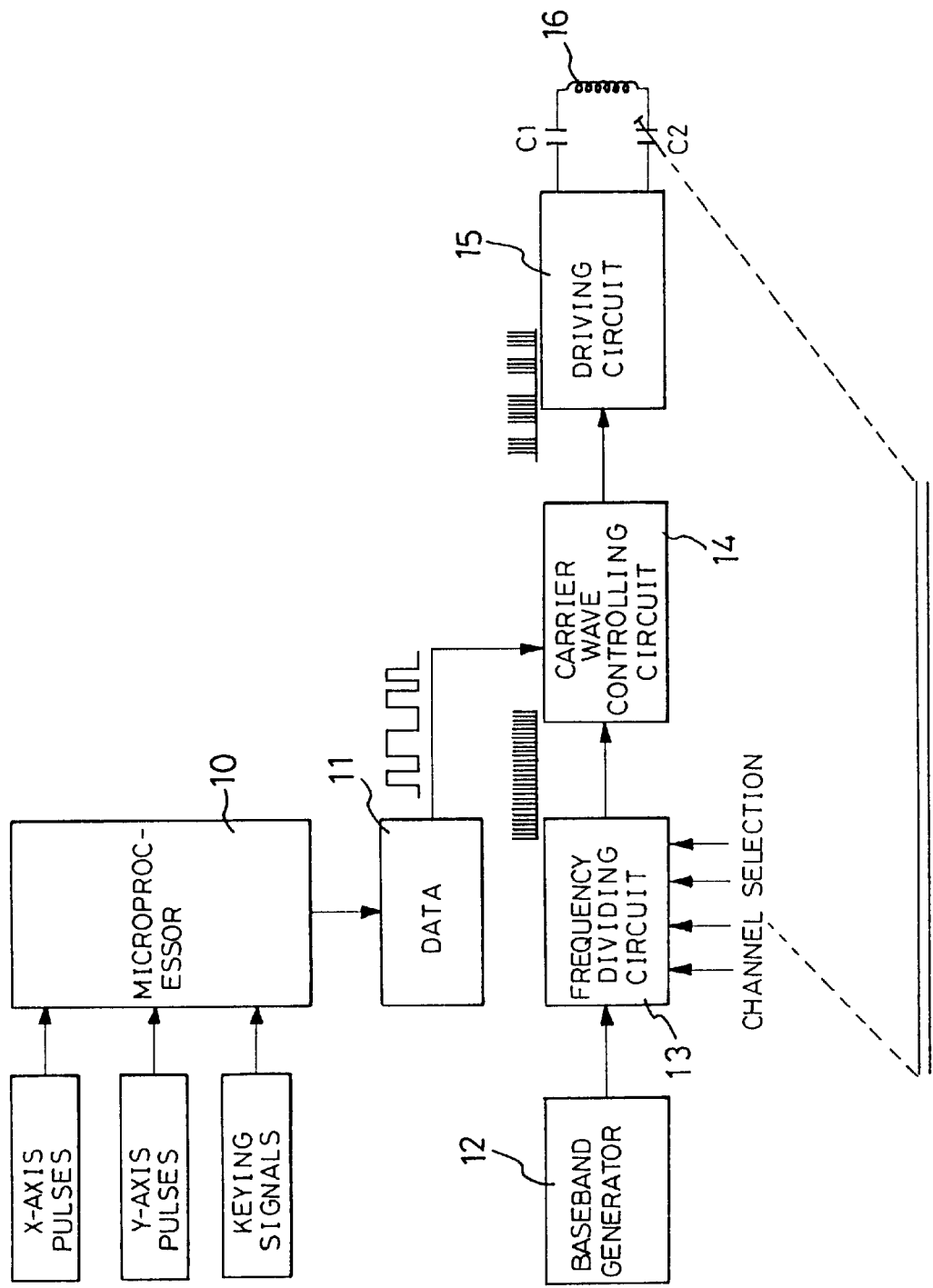
FIG. 1 shows a circuit block diagram of the transmitting end of a low frequency wireless mouse device in accordance with the present invention.

FIG. 1 shows a circuit block diagram of a signal transmitting section of a low frequency wireless mouse device of the present invention. After pulses of X and Y axes generated by moving a mouse and the keying signals generated by pressing a function key are converted into a series of pulse data by processing through a microprocessor 10, the pulse data together with the carrier signals from a baseband generator 12 and a frequency dividing circuit 13 which generates different frequencies by a channel selection are modulated in a carrier wave controlling circuit 14. Finally, after being radio frequency amplified by a driving circuit 15, the modulated pulse data become radio frequency carrier waves transmitted by a transmitting coil 16 after passing through two capacitors C1 and C2.

Figure 2:
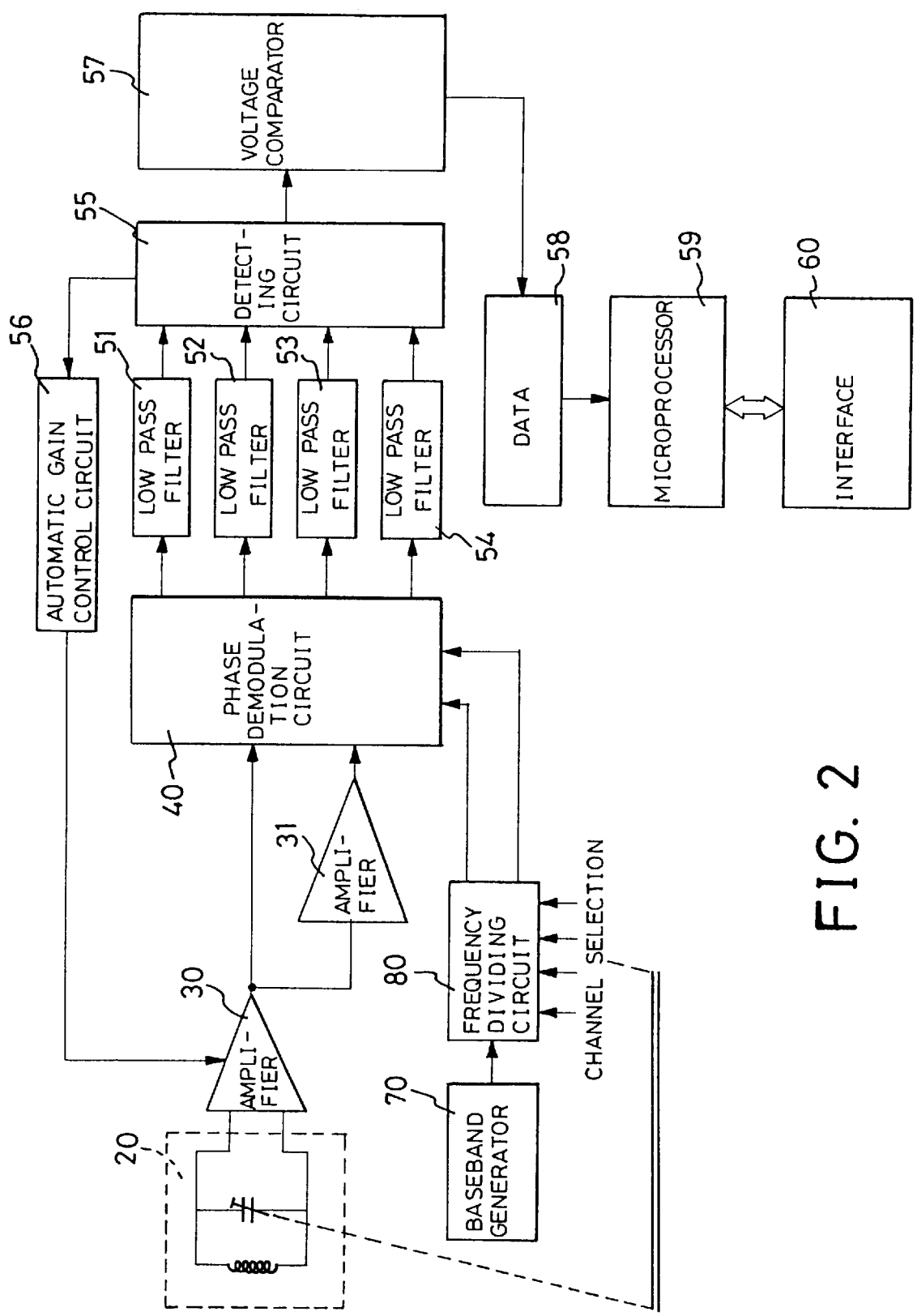
FIG. 2 shows a circuit block diagram of the receiving end of a low frequency wireless mouse device in accordance with the present invention.
Figure 3:
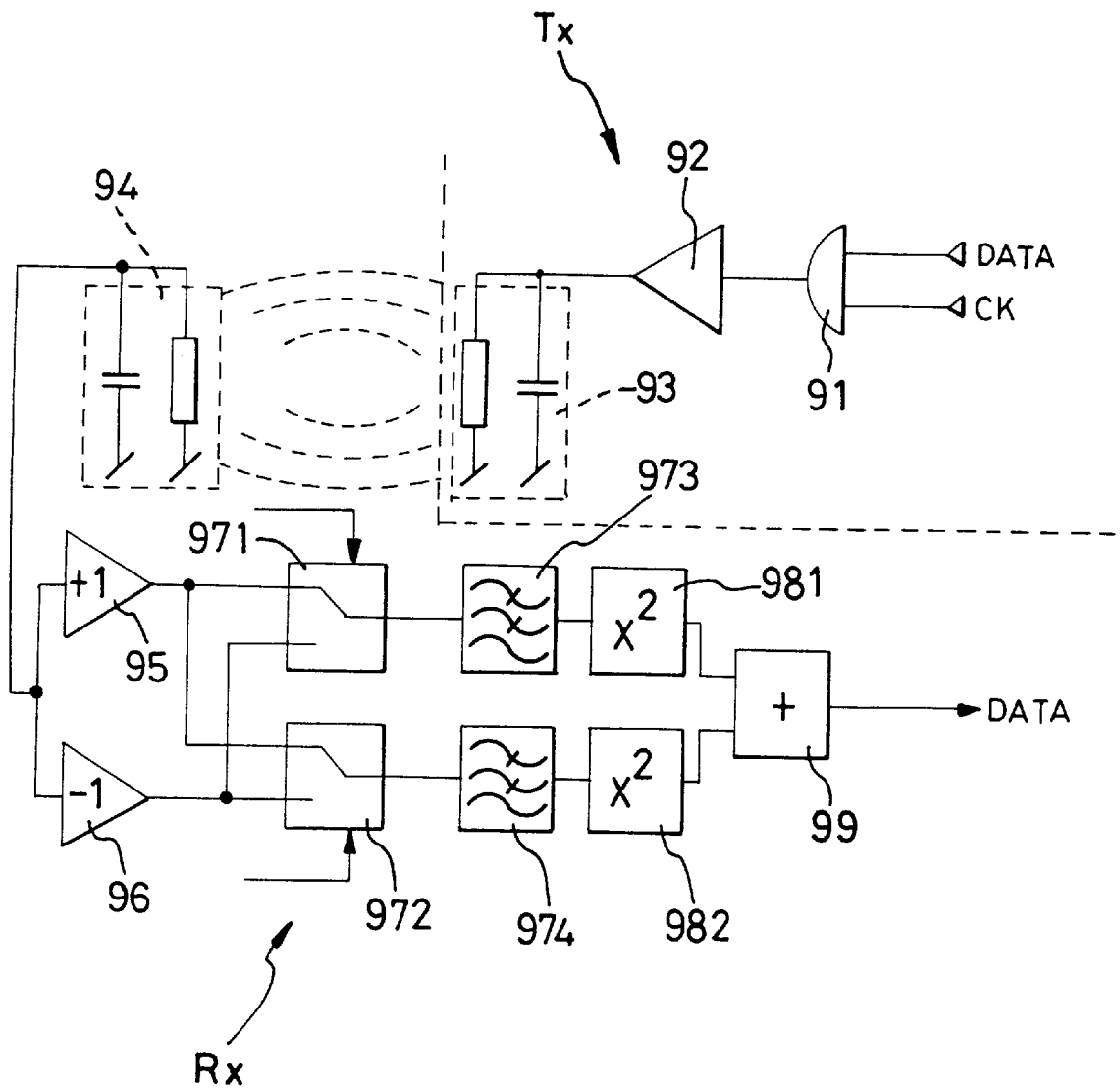
FIG. 3 shows a circuit block diagram of a conventional wireless mouse device.
Figure 4:
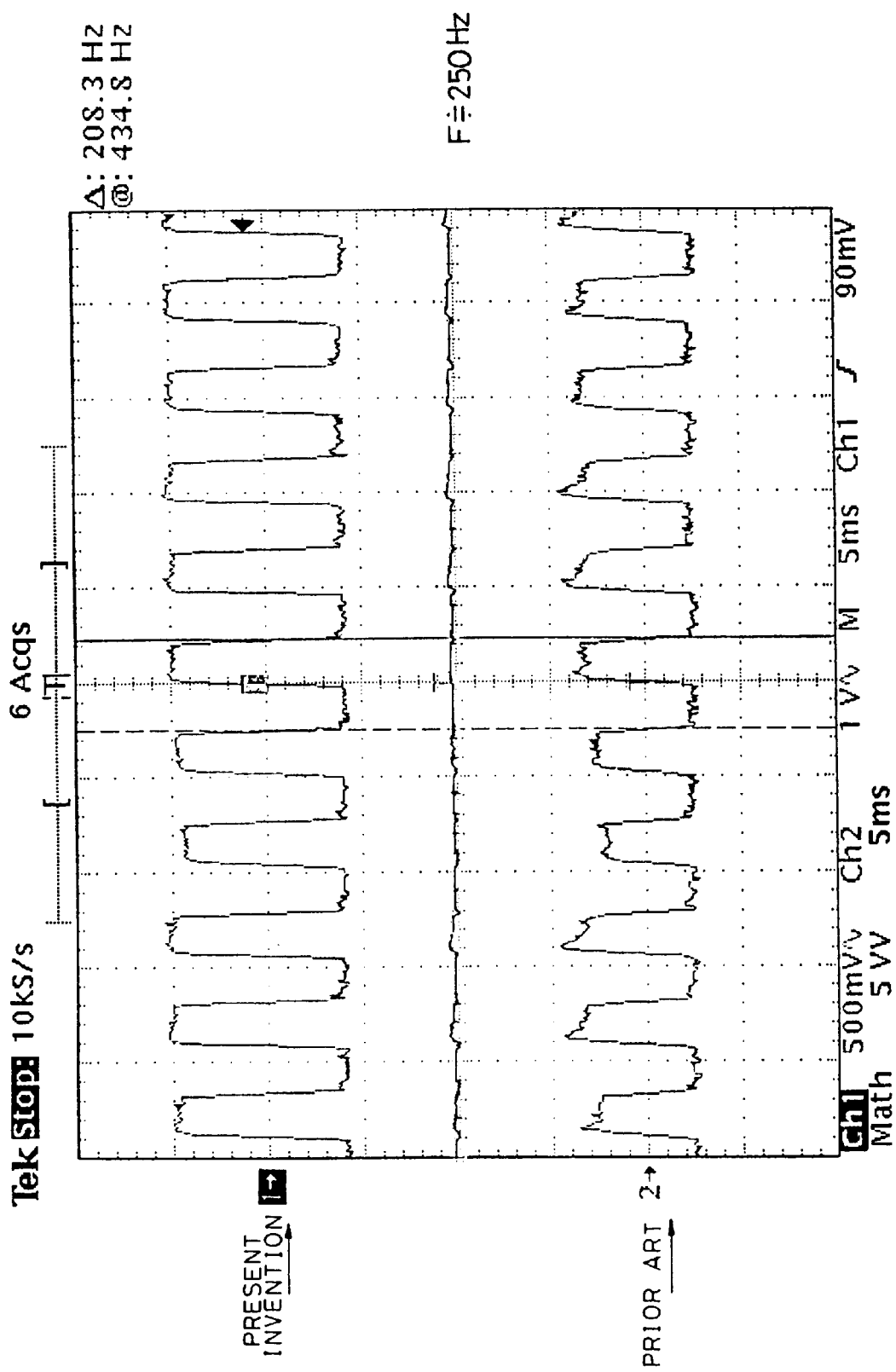
FIG. 4 through FIG. 7 each shows a waveform contrast between the present invention and the prior art detected at a data output terminal of the receiving end at four different signalling frequencies respectively.
Figure 5:
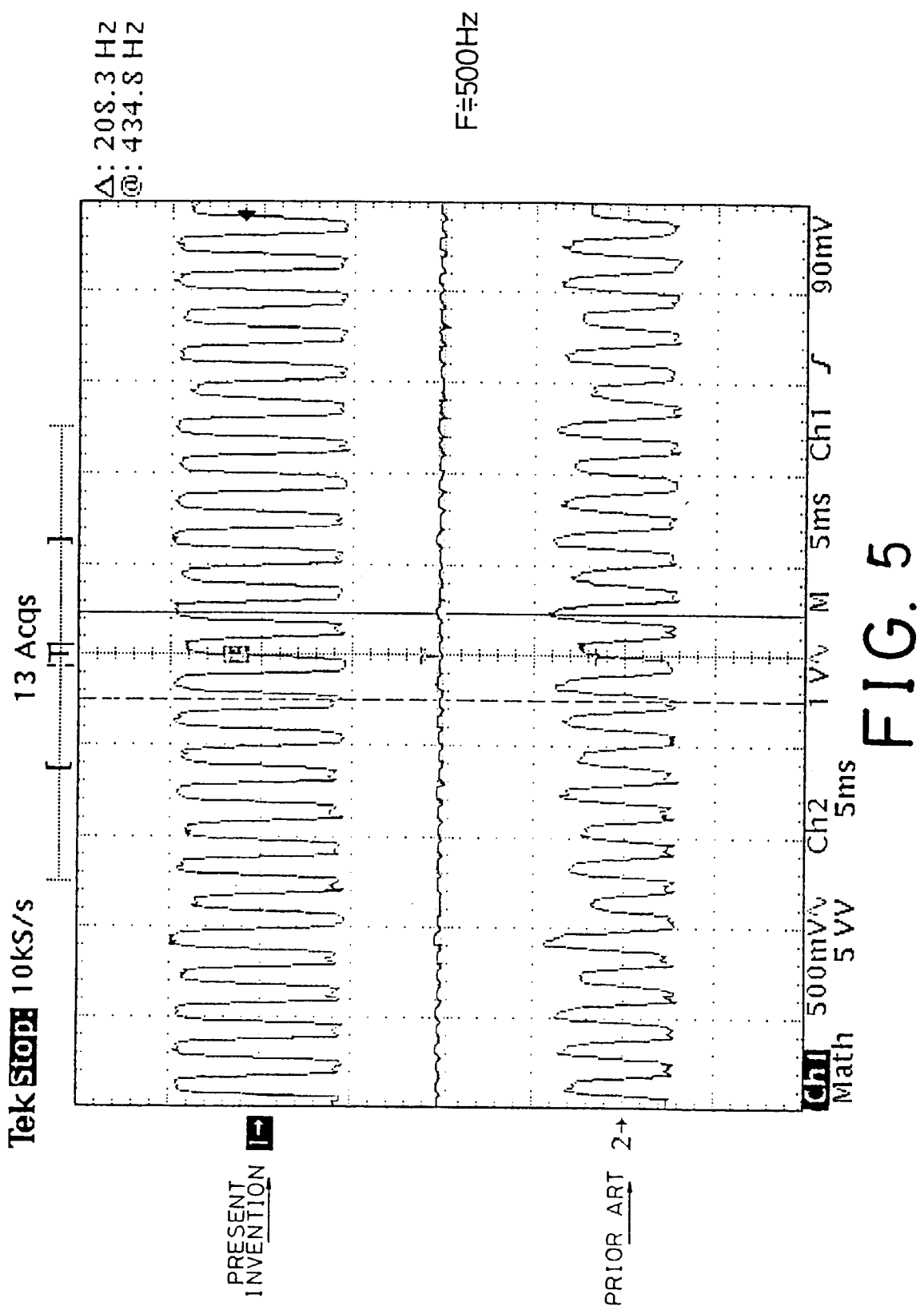
Figure 6:
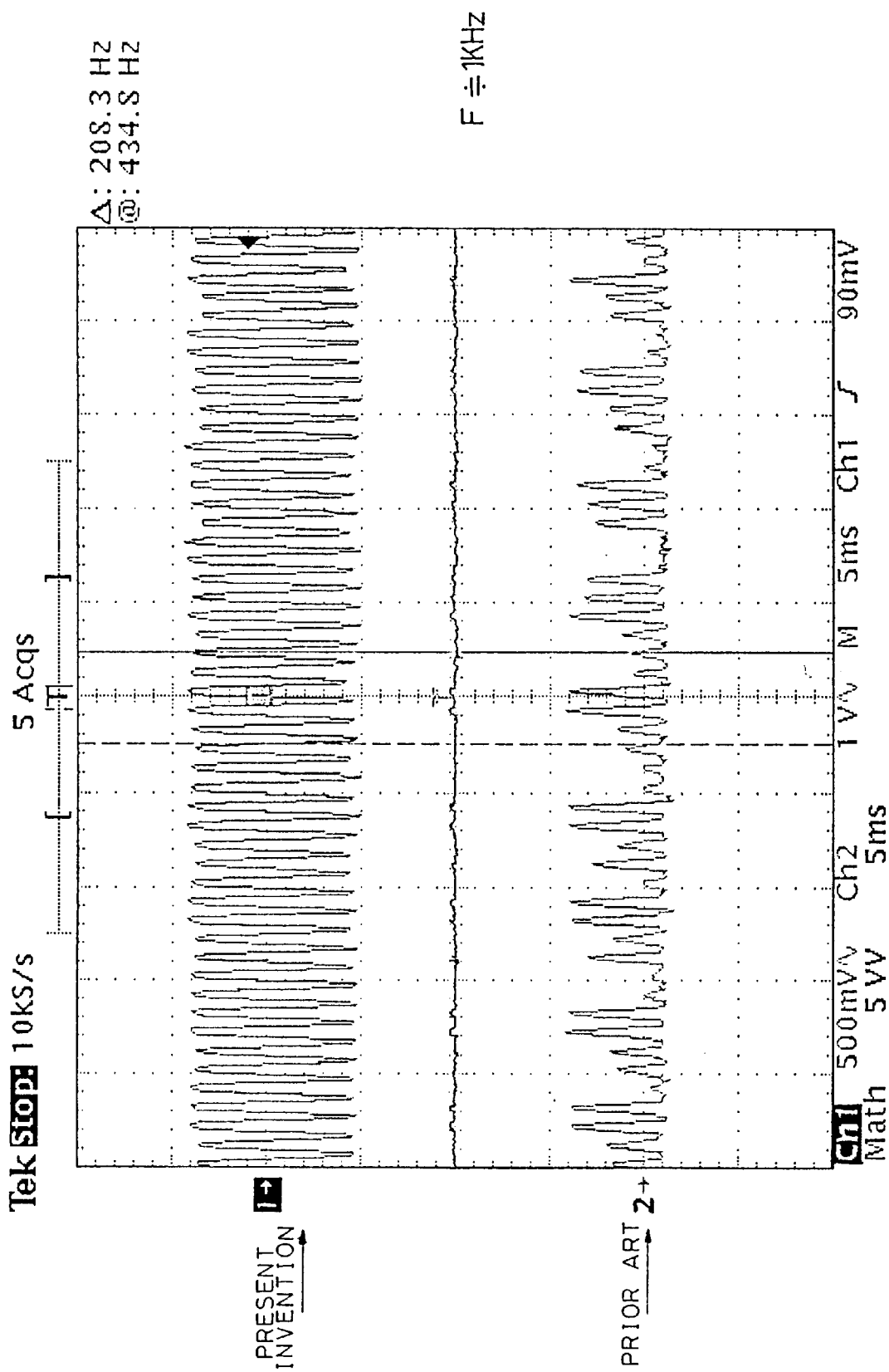
Figure 7:
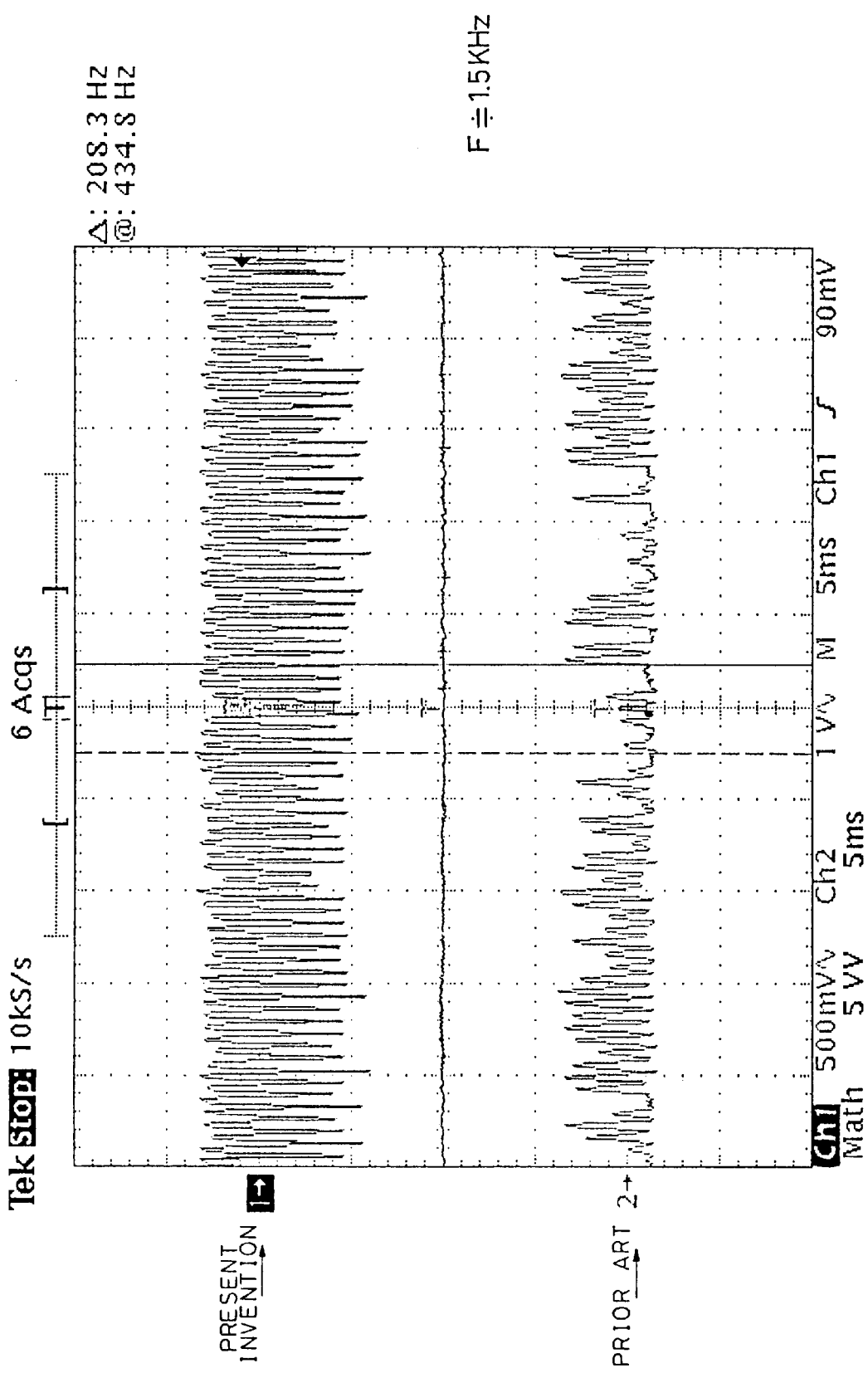

As shown in FIG. 2, the present invention is characterized by changing the corresponding structure of a phase demodulation section at a signal receiving end. The radio frequency carrier waves from the signal transmitting section described above are received by an LC parallel resonant network 20, and converted into two sets of signals having their phases inverted through twp sets of operational amplifiers 30, 31, and then sent into a phase demodulating circuit 40 which can be formed by multiplexers. The timing signals required by the phase demodulating circuit 40 are two sets of clock pulses with a regular frequency (CLK) and a double frequency (2CLK) respectively generated by a baseband generator 70 through a frequency dividing circuit 80 controlled by a channel selection. The phase demodulating circuit 40 is alternately switched through the received signals having either a positive phase or a negative phase and the timing signals and four sets of individual output signals respectively having a phase of 0°, 90°, 180° and 270° are output from the output terminals of the phase demodulating circuit 40. After the four sets of signals respectively pass through four low pass filters 51–54 to eliminate noise signals, the filtered signals are detected and combined by a detecting circuit 55. One of two paths is that the combined signals are fed back to the aforementioned operational amplifier 30 through an automatic gain control circuit 56 to control an amplification ratio thereof. The other of the two paths is that the combined signals are converted into a series of pulse data 58 after directly passing through a voltage comparator 57, that is, the combined signals are recovered to the original pulse data, and then, an effect of communicating with a computer is achieved after the pulse data have gone through an operation by a microprocessor 59 and a serial interface 60 formed of RS-232 or PS-2.

From the phase demodulation structure of the present invention, the comparison is primarily between the steps that the received signals are divided into four sets of individual signals mutually having a phase difference of 90 degrees with each other and then the four sets of individual signals are filtered and detected separately with those steps in the conventional demodulation method. FIG. 4 to FIG. 7 each respectively shows a waveform contrast between the present invention and the prior art detected at a data output terminal of a receiving end at four different signalling frequencies, 250 hertz (Hz), 500 Hz, 1 KHz and 1.5 KHz, respectively. In the cases of the low frequencies of 250 Hz and 500 Hz in FIG. 4 and FIG. 5 respectively, though there is no excessive phase distortion in either case using the conventional biphase demodulation method, the amplitudes of the signals show a relatively unstable status while an advantage of having a more stable amplitude is achieved by signals of the present invention. When the input frequency is increased to 1 KHz and 1.5 KHz shown in FIG. 6 and FIG. 7 respectively (the frequency of the signal of the present invention is set at 1.2 KHz), the recovery of the original signals can still be achieved by the present demodulation method. On the contrary, in view of the biphase demodulating output waveform in the prior art, not only is the amplitude attenuated seriously, but also some of the original pulse, signals can not even be recovered. Therefore, it is sufficient to show that the demodulating effect in the high and low frequency bands in accordance with the present invention is superior to that in a conventional way and the present invention can further show an excellent performance in the high frequency band. Thus, the present invention really has an effect on reducing the error rate. As proved from the waveform contrast described above, since the present invention still has a satisfactory signal demodulation performance when operating at a frequency of 1.5 KHz, it is intended that the higher the operating frequency of the present invention, the higher the speed in transmission between the transmitting end and the receiving end as well as a preferred reaction speed and resolution can be made to a wireless mouse device as comparing the operating frequency of the present invention which is set at 1.2 KHz with a conventional wireless mouse device operating at a low speed in which the highest operating frequency can only be set at 500 Hz. The noise-filtering effect becomes remarkable since the signals can be separated more clearly.

It can be understood from the configuration described above, the received signals by the wireless mouse device in accordance with the present invention are phase demodulated into four sets of phase signals mutually having a phase difference of 90° with each other and then, the noise signals are removed by the respective low pass filters and finally, the original signals are recovered. In this way, the present invention substantially achieves a preferable noise immune effect compared to the conventional demodulation structure. Since the present invention has a stronger ability to eliminate the noise signals than the prior art, the frequency of the timing is adequately increased and a faster reaction speed is achieved.

While the present invention has been explained in relation to its preferred embodiment, it is to be understood that various modifications thereof will be apparent to those skilled in the art upon reading this specification. Therefore, it is to be understood that the invention disclosed herein in intended to cover all such modifications as fall within the scope of the appended claims.

I claim:

1. A four-stage phase demodulation low frequency wireless mouse device formed of a low frequency wireless transmitting means and a signal receiving means is characterized in said signal receiving means comprising:

a tunable LC parallel resonant receiving network for receiving radio-frequency carrier signals from said wireless transmitting means;

two sets of amplifiers connected with said tunable LC parallel resonant receiving network for sending a positive-phase signal and a negative-phase signal;

a baseband generator for producing a time-based signal required for phase demodulation;

a tunable frequency dividing circuit connected to said baseband generator for sending out two sets of timing signals mutually having different frequencies;

a phase demodulation circuit having two input terminals respectively connected with said two sets of amplifiers and two selection input terminals connected with said tunable frequency dividing circuit for generating four sets of phase output signals mutually having a phase difference of 90 degrees with each other;

four sets of low pass filters for respectively filtering said four sets of phase output signals from said phase demodulation circuit;

a detecting circuit for detecting and combining said phase output signals into a single signal after being filtered; and a voltage comparator for converting and recovering said single signal from said detecting circuit to an original pulse signal.

2. A wireless mouse device as claimed in claim 1, wherein each set of said low pass filters performs a two-staged filtering operation.

3. A wireless mouse device as claimed in claim 1, wherein the signal from said voltage comparator is further processed by a microprocessor to become an RS-232 interfacing signal.

4. A wireless mouse device as claimed in claim 1, wherein the signal from said voltage comparator is further processed by a microprocessor to become a PS-2 interfacing signal.

5. A wireless mouse device as claimed in claim 1, wherein said two sets of timing signals having different frequencies respectively are substantially signals having a regular frequency and a double frequency respectively.

6. A wireless mouse device as claimed in claim 1, wherein said four sets of phase output signals are substantially signals having a phase of 0°, 90°, 180°, and 270° respectively.

7. A wireless mouse device as claimed in claim 1, wherein said two sets of amplifiers are substantially formed of operational amplifiers.

8. A wireless mouse device as claimed in claim 1, wherein said phase demodulation circuit is substantially formed of a multiplexer.

* * * * *